United States Patent
Ranta et al.

(10) Patent No.: US 7,477,320 B2
(45) Date of Patent: *Jan. 13, 2009

(54) METHOD AND SYSTEM FOR DOWNLOADING AND STORING INTERACTIVE DEVICE CONTENT USING THE HORIZONTAL OVERSCAN PORTION OF A VIDEO SIGNAL

(75) Inventors: Craig S. Ranta, Redmond, WA (US); Jeffrey M. Alexander, North Bend, WA (US); Harjit Singh, Redmond, WA (US)

(73) Assignee: Buresift Data Ltd. LLC, Wilmington, DE (US)

( * ) Notice: Subject to any disclaimer, the term of this patent is extended or adjusted under 35 U.S.C. 154(b) by 451 days.

This patent is subject to a terminal disclaimer.

(21) Appl. No.: 11/127,916

(22) Filed: May 11, 2005

(65) Prior Publication Data

US 2005/0204400 A1 Sep. 15, 2005

Related U.S. Application Data

(63) Continuation of application No. 09/475,832, filed on Dec. 30, 1999, now Pat. No. 6,937,289.

(51) Int. Cl.
*H04N 7/00* (2006.01)
*H04N 7/08* (2006.01)

(52) U.S. Cl. .................. 348/460; 348/468; 348/469; 348/473; 348/479

(58) Field of Classification Search .............. 348/460, 348/473, 474, 476, 477, 478, 479, 554–558; H04N 7/00, H04N 7/08
See application file for complete search history.

(56) References Cited

U.S. PATENT DOCUMENTS

| | | | |
|---|---|---|---|
| 3,493,674 A | 2/1970 | Houghton | 178/5.6 |
| 3,743,767 A | 7/1973 | Bitzer et al. | 178/5.6 |
| 3,891,792 A | 6/1975 | Kimura | 178/5.8 |
| 3,900,887 A | 8/1975 | Soga et al. | 360/18 |
| 3,993,861 A | 11/1976 | Baer | 178/5.6 |
| 4,186,413 A | 1/1980 | Mortimer | 358/146 |
| 4,207,704 A | 6/1980 | Akiyama | 46/232 |

(Continued)

FOREIGN PATENT DOCUMENTS

EP 0710022 A2 10/1995

(Continued)

*Primary Examiner*—Trang U Tran
(74) *Attorney, Agent, or Firm*—Workman Nydegger

(57) ABSTRACT

A method and system for decoding and storing encoded control data delivered via the horizontal overscan area of a video signal. An interactive device such as a toy performs behavior defined by control data that can be encoded into a video signal. The toy is equipped with a decoder for extracting data from the horizontal overscan portion of the video signal, and a non-volatile memory that permits the control data to be stored for use after the video signal is no longer being received. The control data are delivered as a series of words that include genus codes and sequence codes. Genus codes identify the specific toy to which the word is directed, as more than one toy may receive the video signal. Error grading is used to minimize the effect of such signal deterioration, so the toy will replace previously received words if newer words are of higher quality.

14 Claims, 4 Drawing Sheets

U.S. PATENT DOCUMENTS

| | | | |
|---|---|---|---|
| 4,368,486 A | 1/1983 | Degoulet et al. | 358/146 |
| 4,540,176 A | 9/1985 | Baer | 273/148 |
| 4,599,644 A | 7/1986 | Fischer | 358/84 |
| 4,638,359 A | 1/1987 | Watson | 358/147 |
| 4,660,033 A | 4/1987 | Brandt | 340/825 |
| 4,665,431 A | 5/1987 | Cooper | 358/145 |
| 4,729,563 A | 3/1988 | Yokoi | 273/1 |
| 4,771,344 A | 9/1988 | Fallacaro et al. | 358/335 |
| 4,807,031 A | 2/1989 | Broughton et al. | 358/142 |
| 4,840,602 A | 6/1989 | Rose | 446/175 |
| 4,846,693 A | 7/1989 | Baer | 434/308 |
| 4,847,699 A | 7/1989 | Freeman | 358/343 |
| 4,847,700 A | 7/1989 | Freeman | 358/343 |
| 4,855,827 A | 8/1989 | Best | 358/143 |
| 4,862,268 A | 8/1989 | Campell et al. | 358/141 |
| 4,864,607 A | 9/1989 | Mitamura et al. | 379/388 |
| 4,930,019 A | 5/1990 | Chu | 358/335 |
| 4,949,327 A | 8/1990 | Forsse et al. | 369/58 |
| 4,969,041 A | 11/1990 | O'Grady et al. | 358/142 |
| 5,021,878 A | 6/1991 | Lang | 358/93 |
| 5,108,341 A | 4/1992 | DeSmet | 446/299 |
| 5,198,893 A | 3/1993 | Lang | 358/93 |
| 5,243,423 A | 9/1993 | DeJean | 358/142 |
| 5,255,097 A | 10/1993 | Spiero et al. | 358/181 |
| 5,270,480 A | 12/1993 | Hikawa | 84/645 |
| 5,371,545 A | 12/1994 | Tults | 348/465 |
| 5,398,071 A | 3/1995 | Gove et al. | 348/558 |
| 5,402,419 A | 3/1995 | Osakabe et al. | 370/85.1 |
| 5,450,134 A | 9/1995 | Legate | 348/467 |
| 5,453,794 A | 9/1995 | Ezaki | 348/461 |
| 5,453,795 A | 9/1995 | Tults | 348/465 |
| 5,463,423 A | 10/1995 | Tults | 348/465 |
| 5,483,289 A | 1/1996 | Urade et al. | 348/468 |
| 5,561,469 A | 10/1996 | Schultz | 348/476 |
| 5,629,738 A | 5/1997 | Kim | 348/465 |
| 5,649,080 A | 7/1997 | Minakata | 345/427 |
| 5,655,945 A | 8/1997 | Jani | 446/175 |
| 5,703,658 A | 12/1997 | Tsuru et al. | 348/465 |
| 5,752,880 A | 5/1998 | Gabai et al. | 463/1 |
| 5,808,689 A | 9/1998 | Small | 348/476 |
| 5,812,207 A | 9/1998 | Cahill, III | 348/465 |
| 5,977,951 A | 11/1999 | Danieli et al. | 345/156 |
| 6,005,632 A | 12/1999 | Cahill, III | 348/465 |
| 6,012,961 A * | 1/2000 | Sharpe et al. | 446/298 |
| 6,057,889 A | 5/2000 | Reitmeier et al. | 348/555 |
| 6,072,532 A | 6/2000 | Chieh et al. | 348/478 |
| 6,229,572 B1 | 5/2001 | Ciardullo et al. | 348/473 |
| 6,281,939 B1 | 8/2001 | Del Castillo et al. | 348/558 |
| 6,377,308 B1 | 4/2002 | Cahill, III | 348/461 |
| 6,415,439 B1 | 7/2002 | Randell et al. | 725/153 |
| 6,937,289 B1 * | 8/2005 | Ranta et al. | 348/460 |

FOREIGN PATENT DOCUMENTS

| | | |
|---|---|---|
| WO | WO 92/19073 | 10/1992 |
| WO | WO 93/18614 | 9/1993 |
| WO | WO 93/23955 | 11/1993 |
| WO | WO 94/24820 | 10/1994 |

* cited by examiner

METHOD AND SYSTEM FOR DOWNLOADING AND STORING INTERACTIVE DEVICE CONTENT USING THE HORIZONTAL OVERSCAN PORTION OF A VIDEO SIGNAL

RELATED APPLICATIONS

This application is a continuation of a copending patent application, Ser. No. 09/475,832, filed on Dec. 30, 1999, the benefit of the filing date of which is hereby claimed under 35 U.S.C. § 120.

TECHNICAL FIELD

The present invention relates to data communication systems and, more particularly, relates to encoding interactive device data in the horizontal overscan portion of a video signal and storing the data within an interactive device.

BACKGROUND OF THE INVENTION

Interactive devices have become very popular with consumers. One example of an interactive device is an interactive toy, which is a toy that responds to input from an external data source, such as a user or a video signal. Interactive toys are commonly implemented in the form of a child's doll, such as a teddy bear. An interactive toy will usually be capable of speech and/or motion, collectively referred to as interactive toy behavior. One example of an interactive toy responds to sound impulses, such as the speech of a user or other noises in a room. Another kind of interactive toy responds to data that is delivered by a data stream, such as data delivered via a video signal or over an Internet connection.

Transmitting behavior data via a video signal provides the advantage of enabling the coordination of a video program with a particular interactive device. For example, behavior data can be transmitted to a teddy bear interactive toy during a television program about the same teddy bear. Thus, the behavior of the teddy bear interactive toy can be coordinated with events occurring in the televised program. For example, the teddy bear interactive toy might sing and dance in concert with characters in the televised program.

Providing interactive data to an interactive toy via a video signal has been implemented in various ways. In an early implementation of such an interactive toy, behavior data was transmitted to the interactive toy in a portion of a video signal that was not viewable by the user watching the program. The interactive toy received the data by monitoring the video signal and extracting the behavior data from the non-viewable portion. Unfortunately, in this implementation the behavior data was transmitted in a portion of the signal that was not reproduced when the video transmission was stored on video tape. Thus, the behavior data could only be transmitted via a television broadcast and could not be transmitted via a video taped program. This deficiency limited the market for such interactive toys, as it is desirable to provide behavior data on video tapes that can be sold in conjunction with the interactive toy.

Another approach to transmitting behavior data via a video signal varied the brightness of portions of a video image. This approach provided the benefit of being reproducible on video tape, as the behavior data was transmitted as part of the viewable video signal. The brightness variations were associated with predetermined behavior data. When the interactive toy was placed directly in front of the television screen displaying the video image, a decoder on the interactive toy would translate the brightness variations into behavior data. While this approach permitted the behavior data to be stored on video tape, the approach had other shortcomings. Most notably, the image which refreshes only 60 times per second, makes this approach unsuitable for most applications requiring significant data throughput rates.

One of the more recent implementations of behavior data transmission technology uses the horizontal overscan portion of a video signal to transmit data to an interactive toy. Advantageously, the horizontal overscan portion of the video signal is reproducible on video tape. The achievable data transmission rate is limited by the much faster horizontal refresh rate of the video. The video signal can be decoded either by a separate decoder unit or by the toy itself to extract the behavior data. Once the data has been decoded, the data can be used to cause the toy to perform various speech or actions. Usually, this technology is implemented by transmitting the interactive toy content data during a television show or throughout a program recorded on a video tape.

Unfortunately, interactive toys existing in the prior art were unable to retain the ability to perform the actions defined by the extracted data. That is, once the data transmission was ceased (i.e., the television show or video taped program ended), then the toy lost its ability to perform the actions defined by the interactive toy content data. This problem exists for two reasons: 1) prior art interactive toys do not include a programmable non-volatile memory; and 2) prior art video data encoding systems did not provide enough bandwidth to transfer enough data to support such behavior retention.

Therefore, there is a need for a system capable of delivering interactive toy content data to an interactive toy at a high data throughput rate and for enabling the toy to retain the behavior defined in the interactive toy content data. The system should be able to be deployed over any means of delivering a video signal, such as via television antenna, cable television, or video tape. The system should be robust, such that the effects of data transmission errors can be minimized.

SUMMARY OF THE INVENTION

The present invention meets the needs described above by providing a method and system for decoding and storing control data transmitted in the horizontal overscan portion of a video signal. An interactive device such as an interactive toy performs behavior defined by control data that can be encoded into a video signal that can be broadcast or played-back from video tape. The interactive device is equipped with a non-volatile memory that permits the control data to be stored for performance subsequent to the transmission session (e.g., a televised program). The interactive device also may be equipped to perform behavior during the transmission session. The control data is delivered as a series of control data words that include genus codes and sequence codes. Genus codes identify the interactive device to which the data word is directed, so that a particular interactive device will respond (i.e., perform behavior) only in accordance with the control data words including the appropriate genus code. Because video transmissions are subject to video signal deterioration, error grading is used to minimize the effect of such signal deterioration. During a given control data transmission session, control data words will be repeated, so that an interactive device receives several control data words with the same sequence number. Based on the relative gradings, the interactive device will replace previously received control data words of lower quality than subsequently received data words having the same sequence number.

In one aspect of the invention, a method is provided for delivering and storing interactive device control data using the horizontal overscan portion of a video signal. The video signal is received during a transmission session, such as a television program or a video taped program. Control data is extracted from the horizontal overscan portion of the video signal. After the transmission session has ended, the interactive device performs behavior defined by the control data.

In another aspect of the invention, a system is provided for delivering and storing interactive device control data using the horizontal overscan portion of a video signal. A decoder extracts control data from a horizontal overscan portion of a video signal during a transmission session, such as a television program or a video taped program. The interactive device performs the behavior defined by the control data. The interactive device has a non-volatile memory for storing the control data during the transmission session for use by the interactive device after the transmission session. The interactive device also has a controller for retrieving the control data from the non-volatile memory and for causing the interactive device to perform the behavior defined by the control data.

In yet another aspect of the invention a method is provided for delivering and storing interactive device control data via a video signal. The video signal is received during a transmission session and control data is extracted from the video signal. Behavior defined by the control data is performed during the transmission session and control data is stored in a non-volatile memory in response to the receipt of a storage instruction within the extracted control data After the transmission session ends, the behavior defined by the control data is performed.

In an alternative embodiment, the encoded video signal can also be passed along to the receiving interactive device without decoding. The interactive device can store the received video signal data and then can transmit the stored data to yet another device, which can, in turn, either store or decode the data.

That the invention improves over the drawbacks of the prior art and accomplishes these advantages will become apparent from the following detailed description of the exemplary embodiments and the appended drawings and claims.

DETAILED DESCRIPTION

Figure 1:
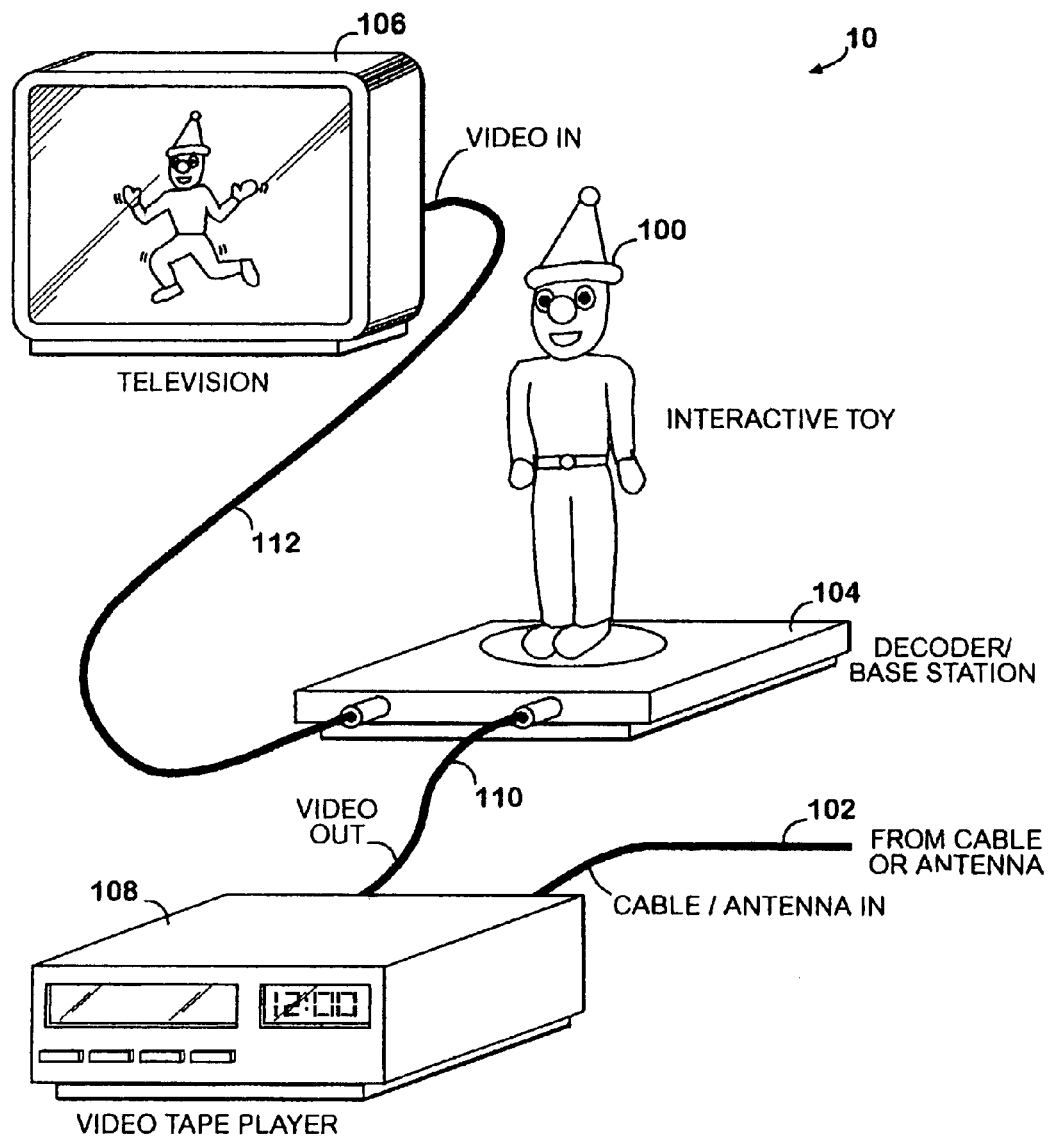
FIG. 1 is a block diagram of a control system for delivering control data to an interactive device via the horizontal overscan portion of a video signal.

An exemplary embodiment of the invention is a system and method for decoding and storing control data received via the horizontal overscan area of a video signal. A method and system for encoding control data into the horizontal overscan area of a video signal is provided in a co-pending U.S. patent application Ser. No. 08/885,385, which is a continuation-in-part of U.S. patent application Ser. No. 08/795,710. Both of these applications are assigned to the Assignee of the present application, Microsoft Corporation, and both applications are hereby incorporated by reference. For the purposes of the following discussion, it is assumed that control data (also called behavior data) has been encoded into the horizontal overscan portion of a video signal.

The present invention may be deployed in a wireless or hard-wired communication environment that includes an interactive device, such as an interactive toy, and a decoder that extracts control data from a video signal and provides it to the interactive device. The interactive device may include a controller and several electromechanical output devices, such as servo-motors, voice synthesizer, and visual devices, such as light bulbs or LEDs. The controller receives control data from the decoder and controls the output devices in accordance with the control data received from the decoder. The controller also can store the received control data in a memory that is also part of the interactive device.

Control data can be transmitted from the decoder to the controller by many well-known means of data transmission. In an exemplary embodiment, the decoder has an infrared transmitter and the interactive device has an infrared receiver. The control data can be transmitted from the transmitter to the receiver in discrete data words over a short distance. Preferably, the decoder has a surface (or base station) upon which the interactive device can be placed to minimize the distance between the transmitter and the receiver.

Control data that is encoded into the video signal may include noise or other erroneous data. In an exemplary embodiment, the controller can store received control data in association with a sequence code. During a particular transmission period (e.g., during a television program), the controller may receive repeated transmissions of the same control data word. Identical control data words have the same sequence number. The controller may replace a previously stored data word with a more recently received data word if the more recent data word has fewer errors in the control data contained therein. A well known grading procedure can be used to determine the quality grade (i.e., number of errors) of a particular data word. When each data word is stored in memory, the grade associated with the word can also be stored in memory. By comparing the quality grade of a stored data word with that of a recently received data word, the controller can replace lower quality data words with higher quality data words.

An Exemplary Interactive Device Control System

Referring now to the drawings, in which like numerals represent like elements throughout the several figures, aspects of the present invention and exemplary operating environments will be described.

FIG. 1 illustrates an exemplary environment for embodiments of the present invention. The depicted environment may be operated as a learning and entertainment system for a child. The environment includes a control system 10 that provides control data to an interactive device, such as interactive toy 100. An exemplary control system 10 includes a video signal source 102, a decoder/base station 104, and a display device, such as television 106. The control system 10 transmits control data to the interactive toy 100 via decoder 104. To accomplish this task, the decoder 104 interfaces with the audio/video signal source 102 and the television 106 through a standard video interface. Over this standard video interface, the decoder 104 receives a video signal encoded with control data (encoded video) from the video signal source 102. The decoder 104 extracts the control data from the encoded video signal, and then transfers the control data to the interactive toy 100.

The control system may also have a video tape player 108. The video tape player 108 can also provide control data that is stored on a video tape played by the video tape player. The video tape player 108 can transmit an encoded video signal to the decoder 104 over a video out line 110 that can be directly connected to the decoder. When the control system is configured with a video tape player 108, as depicted, control data may be provided from either the video signal source 102 or the video tape player 108. This is advantageous, because it is desirable to provide control data both through televised programs (via the video signal source 102) and through taped programs (via the video tape player 108). When control data is provided via the video signal source 102, the encoded video signal will simply pass through the video tape player 108.

In either case, the video signal will be passed through the decoder 104 to the television 106, which will present the encoded video signal in the conventional manner. Thus, a user can observe the video presentation on the television 106 while the decoder 104 transmits control data to the interactive toy 100. The reception of the control data may cause the interactive toy 100 to move and talk as though it is a character in the video program presented on the television 106.

There is no need to modify the encoded video signal before passing it to the television 106. Typically, the decoder 104 receives the encoded video signal, which is a standard video signal that has been modified to include digital information in the horizontal overscan intervals of the scan lines, which are not displayed on the television 106. Thus, the television 106 can receive and display the encoded video signal without modification. The decoder 104 only needs to extract the control data from the encoded video signal and transmit the control data to the interactive toy 100.

In an alternative embodiment, the encoded signal may be delivered by another data transmission means, such as via a computer (not shown). In this embodiment, the decoder 104 could receive encoded data from the computer during a transmission session and could extract the control data. The decoder 104 could then pass the control data along to the interactive toy 100 which could store the control data and perform the behavior defined by the control data during or after the transmission session. A transmission session may be, for example, the period during which a particular computer application is executing.

An Exemplary Interactive Device

Figure 2:
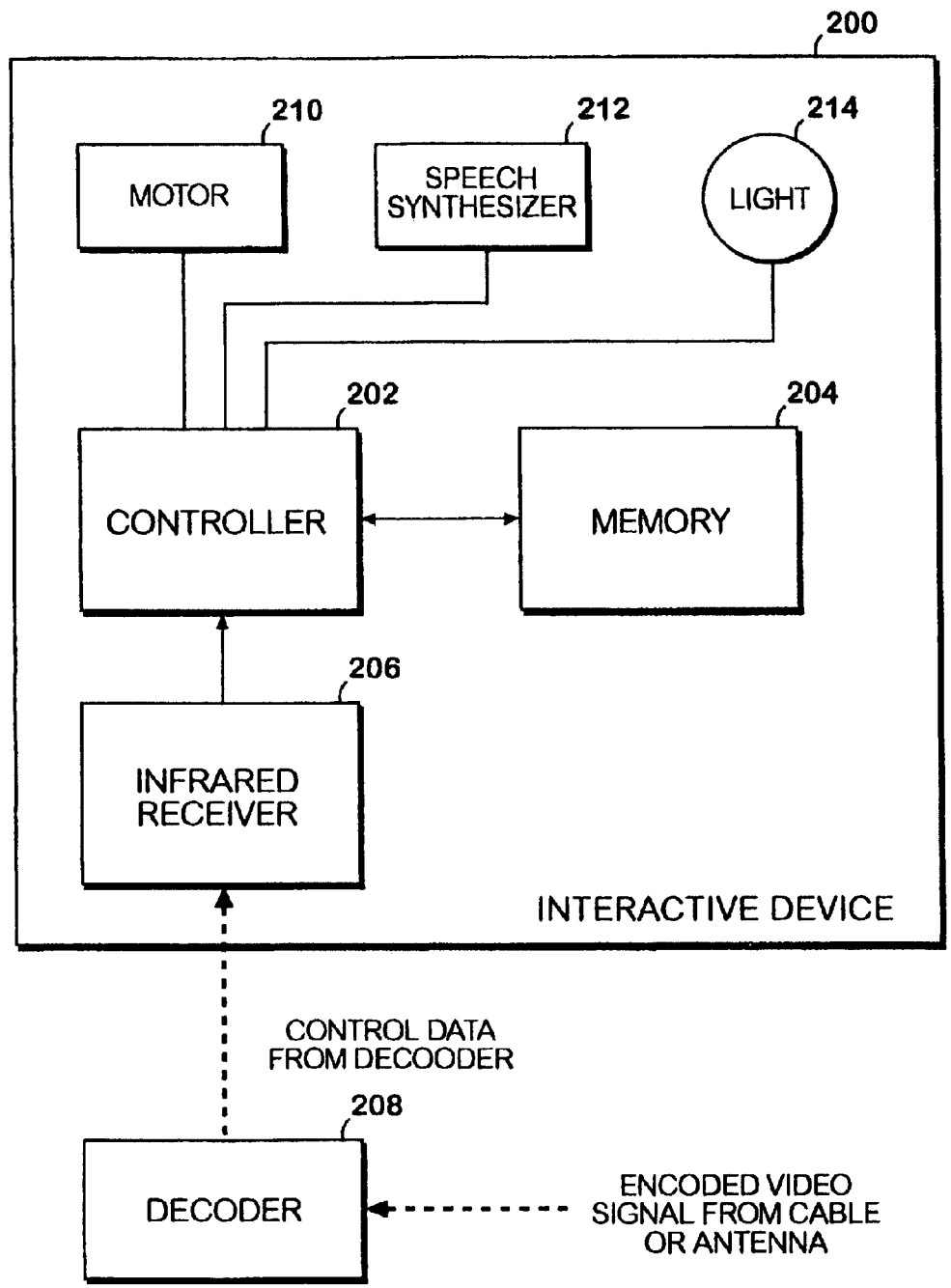
FIG. 2 is a block diagram illustrating the primary functional components of an exemplary interactive device.

FIG. 2 is a block diagram illustrating the primary functional components of an exemplary interactive device 200. As described in connection with FIG. 1, the interactive device 200 receives control data in the form of a series of data words from the decoder 208 by way of infrared receiver 206. The infrared receiver 206 then passes the control data to the controller 202. The controller 202 can store the control data in memory 204 or can cause the interactive device 200 to perform the behavior defined by the control data by controlling electro-mechanical devices 210-214. Alternatively, the controller 202 can retrieve control data from memory 204 and cause the interactive device 200 to perform the behavior defined by the control data. In another alternative embodiment, the controller 202 can cause the interactive device 200 to perform the behavior defined by the control data in real-time (i.e., as it is being received), without storing the control data in the memory 204.

In an alternative embodiment, the decoder 208 could transmit control data by a means other than the described infrared signal. For example, the control data could be transmitted by a radio frequency (RF) signal, whereby the decoder 208 and the interactive device 200 could be separated by a significant distance during transmission of control data. In another alternative embodiment, the decoder may be implemented as an integral part of the interactive device 200. In yet another alternative embodiment, the encoded video signal can also be passed along to the receiving interactive device without decoding. The interactive device of this embodiment can store the received video signal data and then can transmit the stored data to yet another device, which can, in turn, either store or decode the data.

It will be appreciated that the electromechanical devices 210-214 are merely examples of devices that could be incorporated into an interactive device. In response to received control data, the controller 202 may run a motor 210 to cause an interactive toy's limb to move. Alternatively, the controller 202 may provide speech data to drive a speech synthesizer 212 to produce audio output through a speaker (not shown) or may turn on a light 214 or other visual display device. These devices are preferably controlled to coordinate the behavior of the interactive device 200 with a televised program or to teach the interactive device behavior that can be performed subsequent to the televised program. The period during which control data is received by the interactive device 200 (whether via a broadcast or via video tape play-back) is referred to as the transmission session.

Importantly, an exemplary embodiment of the interactive device 200 is equipped with a non-volatile memory 204. The memory 204 permits the storage of control data that can control the behavior of the interactive device 200 even after the encoded video signal stops providing control data. Generally, this means that the behavior of the interactive device 200 persists despite the termination of control data flow into the infrared receiver 206. More practically, this means that an interactive device can be programmed to exhibit behavior that is "learned" during the transmission session of an encoded video signal, long after the transmission session has ended. Accordingly, in an exemplary embodiment of the interactive device 200, the device could perform behavior defined by the control data during and/or after the transmission session.

It will be appreciated by those skilled in the art that the interactive device 200 can be an interactive toy, but could also be implemented as any other device that is capable of receiving and processing control data. An example of another interactive device is an electronic coupon which is described and claimed in a co-pending application filed on Dec. 31, 1999 with U.S. patent application Ser. No. 09/476,291 assigned to Microsoft Corporation. This co-pending application is hereby incorporated by reference.

An Exemplary Control Data Word

Figure 3:
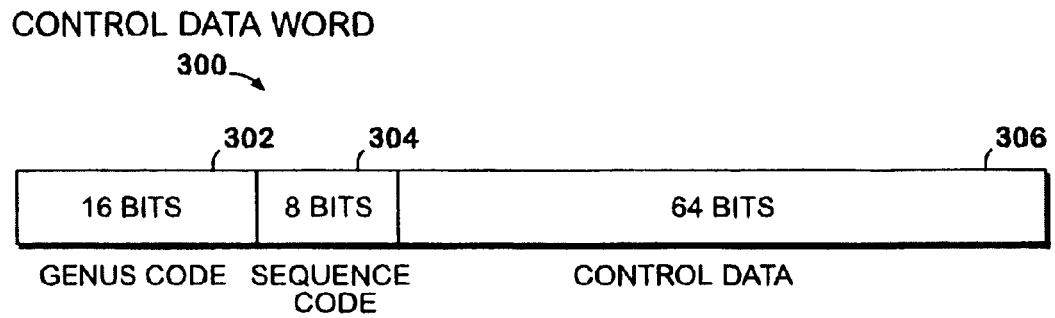
FIG. 3 is a block diagram depicting the primary components of an exemplary control data word.

FIG. 3 is a block diagram that illustrates the primary components of an exemplary control data word 300. Data word 300 includes three main components, a genus code 302, a sequence code 304, and control data 306. In an exemplary embodiment, the genus code is 16 bits in length, the sequence code is 8 bits in length, and the control data is 64 bits in length.

The genus code 302 is used to identify the interactive device to which the control data 306 is directed. The genus code 302 enables the control system 10 (FIG. 1) to avert a situation in which an interactive device receives and performs behavior that was intended for another interactive device. Additionally, use of the genus code 302 permits the receipt of control data by more than one interactive device during the same transmission session, without delivering control data to the wrong interactive device. For example, a video program may involve more than one character, each represented by a separate interactive toy. A user can teach each interactive toy new and separate behavior during the same video program, because each interactive toy will receive only the control data with the proper genus code and will ignore the control data with a different genus code. Genus code filtering can be done by the decoder 208 (FIG. 2) or by the controller 202 (FIG. 2) of the interactive device 200 (FIG. 2).

The sequence code 304 is used to identify control codes delivered to the interactive device during a transmission session. Each unique control code word that is delivered during a transmission session has a unique sequence code 304. The sequence code is useful primarily for two reasons. First, the control data can be ordered in memory, based on the sequence code of the control data word. When the interactive device performs the behavior defined by the control codes in memory, the codes can be performed in order. Thus, the performed behavior can be serialized, such that each stored control word is performed in a particular order. Of course, the controller can also cause the control data to be performed in random order.

Second, the sequence code enables the minimization of the effects of data errors. Because video signal deterioration can cause the introduction of data errors into the control data 300 during transmission, a method for reducing the effects of such errors is provided in an exemplary embodiment of the present invention. When the controller receives a control data word 306, the controller analyzes the control data to identify errors. This analysis can be any one of a number of well known means for identifying errors in transmitted data. For example, the control data might include a checksum in a predefined location that can be compared against the received control data to determine whether the control data contains an error. The controller can then assign the control data word 300 an error grade, that reflects the number or significance of errors identified in the control data 306. The error grade can be stored in memory in association with the control data word 300.

The quality of the stored control data words can be maximized by repeating the transmission of control data words having the same sequence number. When the controller receives a control data word 300 having a new sequence number, then the controller simply saves the data word in memory. When the controller receives a data word having a sequence number matching another data word that is already stored in memory, then the controller may replace the previously stored data word with the newly received data word. To make this determination, the controller generates an error grade for the newly received data word and compares the error grade to the error grade that has been stored in association with the previously stored data word. If the error grade for the newly received data word is greater (i.e., fewer or less significant errors in the control data) than that of the previously stored data word, then the controller will replace the previously stored data word with the newly received data word in memory. The error grade for the newly received data word will be stored in association with the newly received data word in memory.

The control data 306 component of the control data word 300 can include various kinds of data and can be any length suitable for the intended interactive device. Most importantly, it contains the control data that defines the behavior to be performed by the interactive device. However, it can also contain other data, such as the checksum value described above. In an alternative embodiment, the control data 306 component also can include an instruction as to whether the data word should be stored in memory or not stored in memory. In another alternative embodiment, the control data 306 component also can include an instruction as to whether the behavior defined by the control data in the data word should be performed in real-time (i.e., during the transmission session). Those skilled in the art will appreciate that the control data word can be formatted in various ways to provide control data to an interactive device.

An Exemplary Method for Processing Control Data

Figure 4:
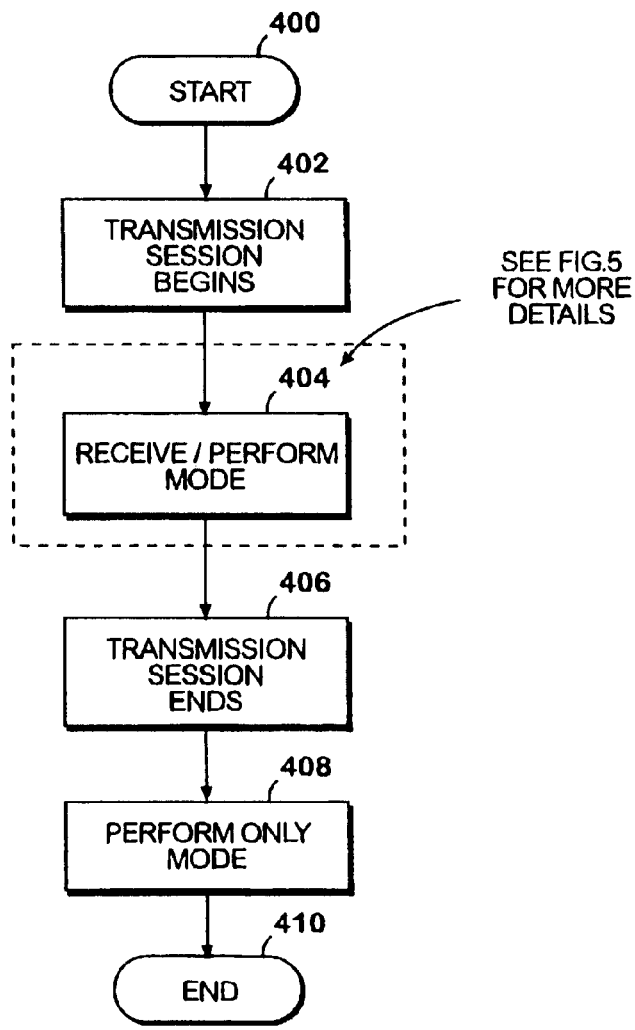
FIG. 4 is a flow chart that illustrates an exemplary method for processing control data words during and after a transmission session.

FIG. 4 is a flow chart that illustrates an exemplary method for processing control data words during and after a transmission session. The method starts at step 400 and proceeds to step 402, wherein the transmission session begins. Normally, this will happen when a television show is broadcast or a video tape is played-back that includes control data encoded within the video signal. The method proceeds to step 404, in which the interactive device enters a receive/perform mode. In this mode, an exemplary interactive device is enabled to receive and store control data. In an alternative embodiment, the interactive device is enabled to perform the behavior defined by the control data in real-time. The method then proceeds to step 406 wherein the transmission session ends. Typically, this will occur when the television program or video tape program is over or when the transmission of control data is terminated. The method then proceeds to step 408, wherein the interactive device switches to perform-only mode. In perform only mode, the interactive device is no longer receiving control data, but simply performs the behavior defined by the control data stored in the interactive device's memory.

It should be appreciated that the interactive device can be switched between Receive/Perform mode and Perform-only mode in various ways. In an exemplary embodiment, the interactive device could be equipped with a switch that the user can operate to select between these modes. Alternatively, the interactive device may be programmed to automatically select an appropriate mode. For example, if the interactive device is powered-up and does not detect a control data transmission at its infrared receiver, then the interactive device may automatically select Perform-only mode. If, on the other hand, the interactive device detects the transmission of control data, then the interactive device may automatically select Receive\Perform mode.

A more detailed description of step 404, the Receive/Perform mode, is provided below in connection with FIG. 5.

An Exemplary Method for Storing Control Data

Figure 5:
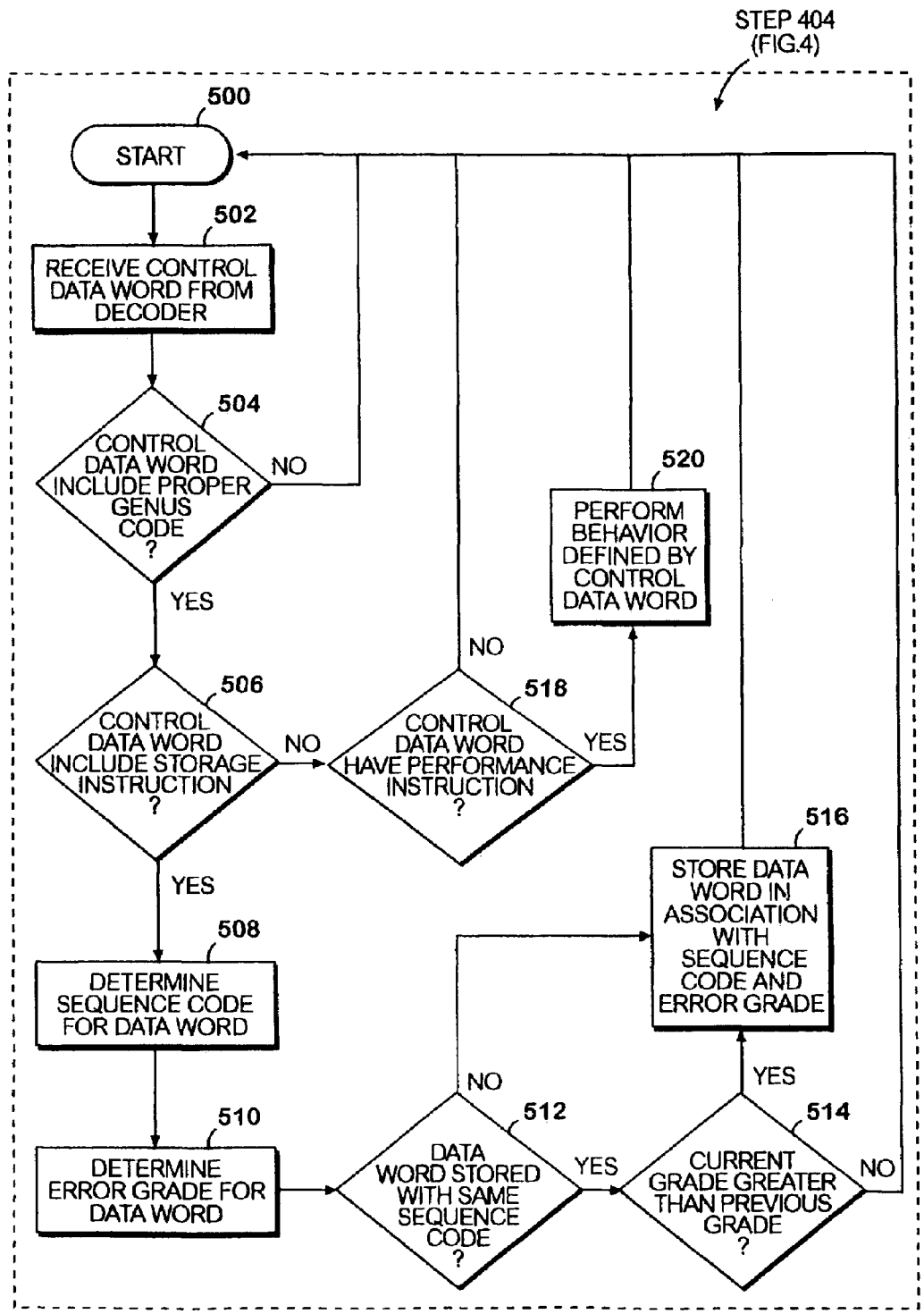
FIG. 5 is a flow chart that illustrates an exemplary method for storing control data words that are extracted from an encoded video signal and for performing behavior defined therein.

FIG. 5 is a flow chart that illustrates an exemplary method for storing control data words that are extracted from an encoded video signal. The method starts at step 500 and proceeds to step 502 in which a control data word is received from the decoder. The method then proceeds to step 504 and a determination is made as to whether the control data word includes a genus code corresponding to the interactive device. If the genus code does not match that of the interactive device, then the genus code is meant for another interactive device, and the method branches back to step 500. Alternatively, if the genus code matches that of the interactive device, then the method branches along the "Yes" path to decision block 506. At decision block 506, a determination is made as to whether the data word includes a storage instruction. If the data word does not include a storage instruction, then the method branches to decision block 518. On the other hand, if the data word includes a storage instruction, then the method branches to step 508.

At step 508, the sequence code for the received data word is determined. The method then proceeds to step 510 and the quality grade is determined for the data word. Those skilled in the art will appreciate that various well known methods exist for determining and grading the quality of data that has been transmitted. Once a quality grade has been determined for the data word, the method branches to decision block 512 and a determination is made as to whether a data word with the same sequence code has been previously stored in memory. If one has not been, then the method branches to step 516 and the data word is stored in memory with its sequence code and its quality grade. On the other hand, if a data word with the same sequence code has been previously stored in memory the method branches to decision block 514, wherein a determination is made as to whether the quality grade of the current data word is greater (i.e., better) than the quality grade of the previously stored data word. If not, then the method branches back to step 500. On the other hand, if the quality grade of the current data word is greater than the quality grade of the previously stored data word, then the current data word is stored in memory with its sequence code and its quality grade. Notably, the current data word will replace the previously received data word, having the same sequence number. Once the data word is stored in memory in step 516, then the method proceeds to step 500.

Returning now to decision block 506, if the received data word does not include a storage instruction, then the method branches to decision block 518. At decision block 518, a determination is made as to whether the received data word includes a performance instruction. If it does, then the method branches to step 520 and the interactive device performs the behavior defined by the received control data word.

The invention thus provides a method and system for decoding and storing encoded control data delivered via the horizontal overscan area of a video signal. An interactive device such as an interactive toy performs behavior defined by control data that can be encoded into a video signal that can be broadcast or played-back from video tape. The interactive device is equipped with a non-volatile memory that permits the control data to be stored for performance subsequent to the transmission session (e.g., a televised program). The interactive device also may be equipped to perform behavior during the transmission session. The control data is delivered as a series of control data words that include genus codes and sequence codes. Genus codes identify the interactive device to which the data word is directed, so that a particular interactive device will respond (i.e., perform behavior) only in accordance with the control data words including the appropriate genus code. Because video transmissions are subject to video signal deterioration, error grading is used to minimize the effect of such signal deterioration. During a given control data transmission session, control data words will be repeated, so that an interactive device receives several control data words with the same sequence number. Based on the relative gradings, the interactive device will replace previously received control data words of lower quality than subsequently received data words having the same sequence number.

It should be understood that the foregoing relates only to specific embodiments of the invention, and that numerous changes may be made therein without departing from the spirit and scope of the invention as defined by the following claims.

What is claimed is:

1. A method for delivering and storing control data for an interactive device using a horizontal overscan portion of a video signal, the method comprising:
   (a) receiving the video signal at the interactive device during a transmission session, the transmission session comprising a plurality of frames, wherein the plurality of frames define a program that is displayed to a viewer during the transmission session;
   (b) extracting the control data from the horizontal overscan portion of the video signal using a decoder integral to the interactive device, said decoder being configured to extract control data encoded into the horizontal overscan portion of the video signal, defining the control data and a genus code with control words, the genus code identifying a specific interactive device for which the interactive device control data are intended;
   (c) storing the control data in the interactive device, such that the control data will be available for use after the transmission session has ended;
   (d) waiting for the transmission session to end;
   (e) after the transmission session has ended, using the control data extracted from the horizontal overscan portion of the video signal during the transmission session and stored in the interactive device to cause the interactive device to perform a behavior defined by the control data.

2. The method of claim 1, wherein the waiting for transmission session to end comprises waiting until the interactive device is no longer receiving the video signal.

3. The method of claim 1, further comprising:
   (a) receiving the video signal at a base station, the base station being configured to convey the video signal to the interactive device via a wireless connection; and
   (b) transmitting the video signal from the base station to the interactive device using the wireless connection.

4. The method of claim 1, wherein extracting the control data comprises processing the extracted control data to assemble the control data into control words, each control word comprising a plurality of data bits, the plurality of data bits defining data useable for controlling the interactive device and at least one of:
   (a) a genus code identifying a specific interactive device for which the control data are intended
   (b) a sequence code identifying an order in which behavior defined by the control data are to be executed in; and
   (c) a sequence code that can be used for error correction.

5. The method of claim 4, wherein when the plurality of data bits comprising the control words include a sequence code that can be used for error correction, further comprising
   (a) using the sequence code to determine an error grade for the control word; and
   (b) determining if the control word is already stored in the interactive device; and if not,
      (i) storing the control word in the interactive device; else
      (ii) storing the control word having a higher quality as indicated by the error grade in the interactive device, and discarding the control word having a lower quality as indicated by the error grade.

6. The method of claim 4, wherein when the plurality of data bits comprising the control words include a genus code identifying a specific interactive device for which the control data are intended, further comprising using the genus code to determine if the control word is intended for the interactive device; and if so storing the control word in the interactive device; else ignoring the control word.

7. A system for delivering and storing control data for use by interactive devices, using a horizontal overscan portion of a video signal, the system comprising:
   (a) an interactive device operative to perform a behavior defined by the control data, the interactive device comprising:

(i) a receiver configured to receive a wireless communication, the wireless communication comprising the video signal;

(ii) a decoder operative to extract the control data from the horizontal overscan portion of the video signal during a transmission session, the transmission session comprising a plurality of frames, wherein the plurality of frames defines a program that is displayed to a viewer during the transmission session;

(iii) a non-volatile memory operative to store the control data extracted during the transmission session for use by the interactive device after the transmission session has ended and the program is no longer displayed to the viewer and control words including a plurality of data bits to define the control data and a genus code, the genus code identifying a specific interactive device for which the interactive device control data are intended, and (iv) a controller operative to retrieve the control data from the non-volatile memory and to cause the interactive device to perform the behavior defined by the control data; and (b) a transmitter configured to transmit the wireless communication to the interactive device.

8. The system of claim 7, wherein the controller is further configured to:

(a) analyze the control data extracted from the horizontal overscan portion of the video signal to determine if the control data defines a control word including a genus code identifying a specific interactive device for which the control data are intended (b) store each control word having a corresponding genus code; and (c) ignore each control word that does not have a corresponding genus code.

9. The system of claim 7, wherein the controller is further configured to:

(a) analyze the control data extracted from the horizontal overscan portion of the video signal to determine if the control data defines a control word that includes a sequence code that can be used for error correction;

(b) use the sequence code to determine an error grade for the control word; and (c) determine if the control word is already stored in the interactive device; and if not,
  (i) storing the control word in the interactive device; else
  (ii) storing the control word having a higher quality as indicated by the error grade in the interactive device, and discarding the control word having a lower quality as indicated by the error grade.

10. A method for delivering and storing control data for an interactive device using a horizontal overscan portion of a video signal, the method comprising:

(a) receiving the video signal at a first interactive;

(b) extracting control words from the horizontal overscan portion of the video signal using a decoder integral to the first interactive device, said decoder being configured to extract control words encoded into the horizontal overscan portion of the video signal, each control word comprising a plurality of data bits, the plurality of data bits defining a genus code and the control data, the genus code identifying a specific interactive device for which the interactive device control data are intended;

(c) analyzing each control word received to determine if the genus code of the control word corresponds to the first interactive device;

(d) for each control word whose genus code corresponds to the first interactive device, storing the control data corresponding to that control word in a non-volatile memory contained within the first interactive device; such that the stored control data will be available for use after the transmission session has ended;

(e) waiting until interactive device is no longer receiving the video signal;

(f) after the interactive device is no longer receiving the video signal, using the control data extracted from the horizontal overscan portion of the video signal previously received and stored in the first interactive device to cause the first interactive device to perform a behavior defined by the control data.

11. The method of claim 10, further comprising transmitting each control word whose genus code does not correspond to the first interactive device from the first interactive device to a second interactive device.

12. The method of claim 11, further comprising:

(a) receiving the video signal at the second interactive device;

(b) extracting control words from the horizontal overscan portion of the video signal using a decoder integral to the second interactive device, said decoder being configured to extract control words encoded into the horizontal overscan portion of the video signal, each control word comprising a plurality of data bits, the plurality of data bits defining a genus code and the control data, the genus code identifying a specific interactive device for which the interactive device control data are intended;

(c) receiving each control word transmitted by the first interactive at the second interactive device (d) analyzing each control word received by the second interactive device from the first interactive device to determine if the genus code of the control word corresponds to the second interactive device;

(e) analyzing each control word extracted from the horizontal overscan portion of the video signal by the decoder integral to the second interactive device to determine if the genus code of the control word corresponds to the second interactive device;

(f) for each control word whose genus code corresponds to the second interactive device, storing the control data corresponding to that control word in a non-volatile memory contained within the second interactive device such that the stored control data will be available for use after the video signal is no longer being received;

(g) waiting until the video signal is no longer being received at the second interactive device; and (h) after the video signal is no longer being received at the second interactive device, using the control data stored in the second interactive device to cause the second interactive device to perform a behavior defined by the control data.

13. The method of claim 10, further comprising transmitting video signal data including an encoded control word whose genus code does not correspond to the first interactive device from the first interactive device to a second interactive device.

14. The method of claim 13, further comprising:

(a) receiving the video signal at the second interactive;

(b) extracting control words from the horizontal overscan portion of the video signal using a decoder integral to the second interactive device, said decoder being configured to extract control words encoded into the horizontal overscan portion of the video signal, each control word comprising a plurality of data bits, the plurality of data bits defining a genus code and the control data, the genus code identifying a specific interactive device for which the interactive device control data are intended;

(c) analyzing each control word received to determine if the genus code of the control word corresponds to the second interactive device;

(d) for each control word whose genus code corresponds to the second interactive device, storing the control data corresponding to that control word in a non-volatile memory contained within the second interactive device such that the stored control data will be available for use after the video signal is no longer being received by the second interactive device;

(e) waiting until the video signal is no longer being received at the second interactive device; and (f) after the video signal is no longer being received at the second interactive device, using the control data stored in the second interactive device to cause the second interactive device to perform a behavior defined by the control data.

* * * * *

UNITED STATES PATENT AND TRADEMARK OFFICE
CERTIFICATE OF CORRECTION

PATENT NO. : 7,477,320 B2  Page 1 of 1
APPLICATION NO. : 11/127916
DATED : January 13, 2009
INVENTOR(S) : Ranta et al.

It is certified that error appears in the above-identified patent and that said Letters Patent is hereby corrected as shown below:

On Title Page
Item (52) U.S. Cl., delete "348/468;" and insert --348/466;--

Column 10
Line 38, delete "intended" and insert --intended;--
Line 44, delete "comprising" and insert --comprising:--
Line 60, delete "so" and insert --so,--

Column 11
Line 18, delete "intended," and insert --intended;--
Line 31, delete "intended" and insert --intended;--

Column 12
Line 32, delete "device" and insert --device;--
Line 45, delete "device" and insert --device;--

Column 13
Line 10, delete "device" and insert --device;--

Signed and Sealed this

Twenty-seventh Day of October, 2009

David J. Kappos
*Director of the United States Patent and Trademark Office*